Figure 1:
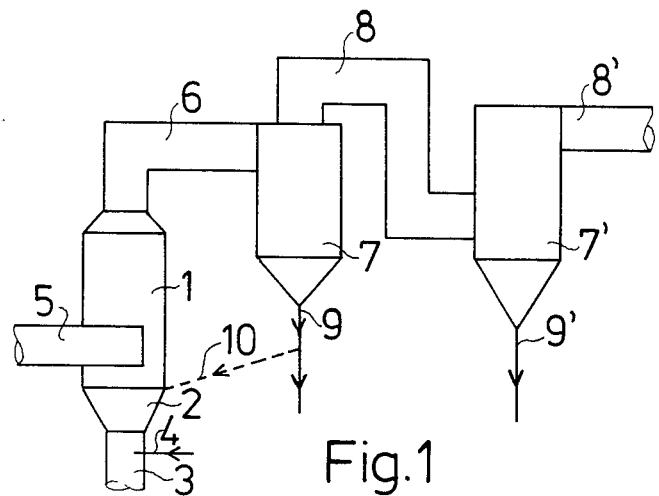

United States Patent [19]

Bhatia

[11] Patent Number: 4,562,054

[45] Date of Patent: Dec. 31, 1985

[54] TREATMENT OF FLUE GAS

[75] Inventor: Vinay K. Bhatia, Copenhagen, Denmark

[73] Assignee: F. L. Smidth & Co. A/S, Denmark

[21] Appl. No.: 634,985

[22] Filed: Jul. 25, 1984

[30] Foreign Application Priority Data

Jul. 29, 1983 [DK] Denmark .............................. 3485/83

[51] Int. Cl.$^4$ .......................... C01B 17/00; B01J 8/00
[52] U.S. Cl. .................................... 423/244; 423/242; 159/48.1
[58] Field of Search ........... 423/242 R, 242 A, 244 R, 423/244 A; 159/48.1

[56]  References Cited

U.S. PATENT DOCUMENTS 4,061,476 12/1977 Holter et al. ........................ 423/244
4,293,524 10/1981 Tiller et al. ......................... 423/242

FOREIGN PATENT DOCUMENTS 49-8458  1/1974  Japan .................................. 423/242
49-8459  1/1974  Japan .................................. 423/242
58-51924 3/1983  Japan .................................. 423/244

Primary Examiner—Gregory A. Heller
Attorney, Agent, or Firm—Brumbaugh, Graves, Donohue & Raymond

[57]  ABSTRACT

A method of removing acid gases from hot flue gases wherein the flue gas is fed through a pipe (3) and up through a tubular reaction chamber (1) having a diverging bottom wall (2) which causes a rapid reduction in axial velocity. Further flue gas is introduced tangentially through a pipe (5) to produce a rising swirling stream of flue gas, in which a powdery absorption agent, that has been introduced through an inlet (4), is entrained. The agent reacts with the acid gas to produce powdery reaction products which are subsequently removed in separators (7,7').

23 Claims, 2 Drawing Figures

TREATMENT OF FLUE GAS

The present invention relates to a dry method, hereinafter referred to as of the kind described, of removing an acid gas, particularly including oxide(s) of sulphur, from hot flue gas, wherein an absorption agent il the form of a fine powder is introduced and dispersed in a stream of the hot flue gas in a tubular reaction zone having a central vertical axis, whereby the acid gas is absorbed by and reacts with the absorption agent at a temperature within the range 500°–900° C. to produce a powder comprising reaction products and unreacted absorption agent suspended in the flue gas, whereafter the powder is separated from the flue gas in a separating zone. The invention relates also to an apparatus for carrying out this method. The term "powder" as used in the present specification means a non-sticky easy flowing pulverulent material.

Various processes for removing sulphur oxides and other acid gases from flue gas from, e.g., power plants and incinerators, are known.

A review of such processes is given in U.S. Ser. No. 4 197 278.

Most of these fall within one of the following main groups:

(i) Wet methods comprising scrubbing the flue gas with suspensions or solutions of hydroxides or carbonates of alkali or alkaline-earth metals wherein the reaction products are withdrawn as a sludge.

The main advantages of the wet methods are: high sulphur oxide removal even at high sulphur oxide concentrations in the hot flue gas and high absorbent utilization. The main disadvantages are: undesirable end products occuring as a sludge presenting serious disposal problems and water saturated exit gas which must be heated prior to discharge to the atmosphere. Furthermore, clogging and corrosion in the scrubber lead to operational difficulties and un-availability of wet scrubbers.

(ii) The semi dry methods wherein the flue gas is brought into contact with aqueous suspensions or solutions of hydroxides or carbonates of alkali or alkaline-earth metals under such conditions that the water is evaporated and the reaction products are withdrawn as a dry powder.

The semi dry methods provide highly improved sulphur oxide removal and absorbent utilization compared to the known dry methods, although in general not as high as may be obtained by the wet methods, easily dischargeable desulphurized flue gas, and a dry, fluent solid powder as end product.

(iii) Dry methods wherein the flue gas is brought into contact and reacted with dry absorption agents and wherein the reaction products are withdrawn as a dry powder.

The main advantages of the dry methods are: elimination of clogging risks, dry solid end products and an exit gas which can be easily discharged to the atmosphere. However, since the gas/solid reactions are relatively slow, the sulphur oxide removal and absorbent utilization are low by the known methods.

Another problem when developing suitable dry flue gas desulphurization methods consists in providing a method with sufficient turn-down ratio to cope with varying flue gas rates characteristic of power plants.

Although great efforts have been devoted for developing dry flue gas desuphurization methods there is a need for an effective, commercially feasible method and a simple compact apparatus for removing sulphur oxides and other acid gases from flue gas, in particular from flue gas produced in power plants and incinerators, providing adequate sulphur oxide removal and efficient utilization of an inexpensive absorption agent at varying flue gas loads.

It has now been found that it is possible to perform a method of the kind described, allowing large concentrations of suspended material in the reaction zone and providing a radically increased gas solid contact, resulting in adequate sulphur oxide removal and efficient utilization of absorption agent at varying flue gas loads, which can be worked in a compact apparatus of uncomplicated design.

This is achieved by a method of the kind described which, according to the invention, is characterized by introducing, dispersing and suspending the absorption agent in a rising swirling stream of the hot flue gas at the lower part of the reaction zone, introducing at least a part of the hot flue gas axially at the bottom of the reaction zone as a stream which is subjected to a rapid reduction in axial velocity at the lower part of the reaction zone; and removing the resulting powder from the upper part of the reaction zone suspended in and entrained by the flue gas.

This method provides an extremely intimate gas solid contact due to interplay between centrifugal forces, gravity forces and frictional forces between gas and suspended material.

Interplay between gravity forces and frictional forces results in axial transport of suspended material, whereas interplay between centrifugal forces and frictional forces laeds to precipitation in the reaction chamber. Interplay between these two mechanisms may give rise to any desired internal recirculation rate of the material in the reaction chamber. It is therefore possible to maintain desired particle build-up in the reaction zone providing efficient treatment at both high and low flue gas load, since the method according to the invention at high loads is operated with more intensive swirl, resulting in a higher internal recirculation rate of material in the reaction zone.

Moreover, the above described movement of gas and suspended material leads to high relative velocities between gas and suspended material, leading to reduction of the gas phase diffusion resistance.

The new method allows a significantly higher concentration of suspended material in the reaction zone than that achieved by methods operating with a descending or horizontal cocurrent gas particle flow.

A lower limit for the temperature of the hot flue gas introduced into the reaction zone is in general 500° C.

If desired fly ash may be removed totally or partially from the hot flue gas before it is introduced into the reaction zone.

The axial velocity of the hot flue gas introduced at the bottom of the reaction zone may vary depending on load and size of the particles circulating in the reaction zone. However, it must be sufficiently high to maintain particle hold-up in the reaction zone and to prevent particle fall-out from the bottom of the zone.

The reduced velocity of the flue gas must be sufficiently high to ensure transport of the particles out of the upper part of the reaction zone, but sufficiently low to ensure proper material build-up in the reaction zone, taking into consideration that increasing swirl movement results in increasing internal recirculation, i.e. increasing material holdup.

Preferably the axial velocity of the hot axially introduced stream of flue gas is within the range 10-60 m/sec, most preferably 25-45 m/sec, while the axial velocity of the rising swirling stream of hot flue gas in the middle of the reaction zone is within the range 2-20 m/sec, preferably 3-6 m/sec, and while the reduction in axial velocity at the lower part of the reaction zone corresponds to a velocity ratio $v_{initial}/v_{reduced}$ within the range 3-20, preferably 4-9.

The rapid reduction in axial velocity preferably takes place during a period of time within the range 0.05-0.2 times the gas retention time in the reaction zone, e.g. by directing the hot flue gas through a divergent annular frustoconical bottom part of the reaction zone, in particular having an apex angle greater than 12°, preferably within the range 12°-120°, in particular 40°-90°. Apex angles greater than 120° are not desirable because of risk of undesirable material build-up on the frustoconical bottom of the reaction zone.

The swirling flow of the hot flue gas may be provided by means known per se from the technology of vortex chambers and separating cyclones, e.g. by bringing the hot gas stream into rotation, e.g. by passing the gas stream through a swirl-inducing zone, before it is introduced axially into the reaction zone, by means of radial guide vanes arranged in the reaction zone, or by introducing a second stream of hot flue gas tangentially into the reaction zone. This second stream may be introduced at one or several positions, preferentially close to the bottom part of the reaction zone.

When it is desired to remove fly ash from the hot flue gas before it is introduced into the reaction zone, and when the swirl movement is provided by passing the gas stream through a swirl-inducing zone before it is introduced axially at the bottom of the reaction zone, the swirl-inducing zone may comprise a vertical cyclone arranged directly below the reaction zone, the cyclone functioning as both fly ash precipitator and swirl-inducer.

The absorption agent is preferentially a powder with a particle size within the range 20-150 micron, and is selected from the group comprising oxides, hydroxides and carbonates of calcium, magnesium and alkali metals. Soft burned lime as obtained from a gas suspension calciner is a preferred absorption agent.

According to preferred arrangements the absorption agent is burned lime with a temperature within the range 500°-900°, which may be introduced into the reaction zone as a gas suspension, preferably directly from a gas suspension calciner.

Preferred operating conditions are characterized in that the gas retention time in the reaction zone is within the range 1-5 seconds, preferably 2-3 seconds, and that the material retention time in the reaction chamber is within the range 1-8 minutes, preferably 3-5 minutes, where the material retention time $t_M$ is defined as $$t_M = H_M/W_M,$$

where $H_M$ is the material hold-up in the reaction zone (kg), and $W_M$ is the material input (kg/min.) of fresh absorption agent plus solid particles present in the hot flue gas.

As mentioned above the powder comprises reaction products and unreacted absorption agent. However, the flue gas entering the reaction zone will in general entrain fly ash particles which will be precipitated in the separating zone.

A part of the powder precipitated in the separating zone may be recirculated to the reaction zone. When operating with this external powder recirculation, the external powder recirculation rate may be equal to 10-70 times, preferentially 15-30 times, the input rate of absorption agent and solid particles present in the hot flue gas, where input rate of absorption agent is defined as input rate of fresh absorption agent not comprising unreacted absorption agent introduced with the powder.

When the method is operated at high flue gas loads high intensive swirl is generated giving rise to particle build-up due to high internal recirculation of material in the reaction zone necessitating only a moderate external recirculation, if any. Whereas at low flue gas loads the method is operated with less intensive swirl necessitating a higher external recirculation in order to provide a desired particle holdup in the reaction zone.

The average particle diameter of the externally recirculated powder is preferentially within the range 20-150 micron.

The dry powder separated in the separating zone may be subjected to mechanical treatment, such as attrition or comminution, for generating new reaction surface.

According to a preferred embodiment a $SO_2$ oxidizing catalyst such as $Fe_2O_3$ may be added to the absorption agent or the externally recirculated powder.

The temperature in the reaction zone is in general kept within the range 500°-900° C., preferably 600°-800° C.

After leaving the reaction zone, the flue gas is dedusted, whereby powder comprising unreacted absorption agent, reaction products and optionally fly ash are removed in the separating zone in one or two steps in separators known per se.

The separating zone may comprise two subzones, a first subzone for precipitation of coarse particles and a second subzone for precipitation of fine particles. If desired a heat recovery zone may be installed between the first and the second subzones.

The invention also includes apparatus for carrying out the method, the apparatus being characterized in comprising a tubular reaction chamber having a central vertical axis, an annular bottom wall which slopes downwardly and inwardly, an inlet for hot flue gas comprising a gas inlet opening arranged centrally in the bottom wall and means for giving the flue gas a swirling movement, a duct for feeding absorption agent into the lower part of the reaction chamber, and a suspension outlet at the top of the reaction chamber connected to a particle precipitator having a powder outlet and a gas outlet.

The extremely intimate gas solid contact and the high concentration of solid material in the reaction zone permit the use of a very compact apparatus of simple design and corresponding low investment costs.

Preferably the apex angle of the annular bottom wall is greater than 12°, most preferably within the range 12°-120°, in particular 40°-90°; and the ratio $A_{upper}/A_{lower}$ between the areas of the upper and lower part of the annular bottom wall is within the range 3-20, preferably 4-9.

According to one construction, the inlet for hot flue gas comprises a swirl chamber arranged below the central gas inlet opening in the bottom wall of the tubular reaction chamber.

According to another construction, the inlet for hot flue gas comprises at least one tangentially arranged gas inlet in the tubular reaction chamber, preferably arranged at the lower part of the chamber.

When it is desired to operate the apparatus with an external powder recirculation the tubular reaction chamber may be provided with a powder inlet duct arranged at the lower part of tubular reaction chamber and connected to the powder outlet of the particle precipitator.

The apparatus may be provided with means subjecting the powder withdrawn from the particle precipitator to surface regeneration by attrition or comminution before it is recirculated to the reaction zone.

As particle precipitator any known apparatus may be used.

According to a preferred arrangement, the particle precipitator comprises a coarse separator, e.g. a cyclone separator, arranged upstream of a fine separator, e.g. an electrostatic filter or a fabric filter.

Figure 2:
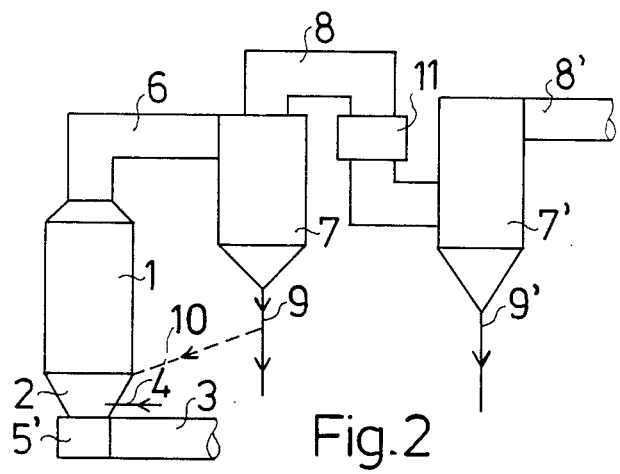

The invention will now be further described with reference to the accompanying drawings, in which FIGS. 1 and 2 show diagrammatically examples of an apparatus according to the invention.

Referring to the Figures, the apparatus comprises a tubular reaction chamber 1 provided with an annular bottom wall 2, an inlet duct 3 for hot flue gas, an inlet duct 4 for absorption agent, and means for giving the flue gas a tangential velocity component comprising a gas inlet duct 5 tangentially arranged at the lower part of the tubular reaction chamber shown in FIG. 1 and a swirl chamber 5' shown in FIG. 2. The top of the reaction chamber is, via a duct 6, connected to a particle precipitator comprising a separating cyclone 7 with material outlet 9. The exit gas from the separating cyclone 7 is, via a gas outlet duct 8, directed to an electrostatic filter 7' with a material outlet 9' and a gas outlet duct 8'. The powder precipitated in the particle precipitator is discharged as waste product. However, a part of this powder may be recirculated to the reaction chamber via a powder transfer duct 10. The apparatus illustrated in FIG. 2 further comprises a heat recovery section 11 installed between the separating cyclone 7 and the electrostatic filter 7'.

I claim:

1. In a dry method of removing sulfur oxides from hot flue gas, whereby an absorption agent in the form of a fine powder is introduced and dispersed in a stream of said hot flue gas in a tubular reaction chamber having a central vertical axis; said sulfur oxides are absorbed by and react with said absorption agent at a temperature within the range 500°-900° to produce a powder comprising reaction products and unreacted absorption agents suspended in said flue gas, and said powder is separated from said flue gas in a separate separating zone; the improvement involving introducing, dispersing and suspending said absorption agent selected from the group comprising oxides and hydroxides of calcium and magnesium, and oxides, hydroxides and carbonates of alkali metals in a rising swirling stream of said hot flue gas at a lower part of said reaction zone, introducing said hot flue gas axially at the bottom of said reaction zone as a stream which is subjected to a rapid reduction in axial velocity at said lower part of said reaction zone, and removing said resulting powder from an upper part of said reaction zone suspended in and entrained by said flue gas.

2. A method according to claim 1, wherein said axial velocity of said axially introduced stream of hot flue gas is within the range of 10–60 m/sec, the axial velocity of said rising swirling stream of hot flue gas in a middle of said reaction zone is within the range 2–20 m/sec, and said rapid reduction in axial velocity at said lower part of said reaction zone corresponds to a ratio of initial velocity over reduced velocity within the range of 3–20.

3. A method according to claim 2, wherein said axial velocity of said axially introduced stream of hot flue gas is within the range 25–45 m/sec, said axial velocity of said rising swirling stream of flue gas is within the range 3–6 m/sec, and said velocity ratio is within the range 4–9.

4. A method according to claim 1, wherein said rapid reduction in axial velocity takes place during a period of time within the range 0.05–0.2 times the gas retention time in said reaction zone.

5. A method according to claim 1, wherein said rapid reduction in axial velocity is provided by directing said rising axially introduced stream of hot flue gas through a divergent annular frustoconical bottom part of said reaction zone.

6. A method according to claim 5, wherein said frustoconical bottom part has an apex angle greater than 12°.

7. A method according to claim 6, wherein said apex angle is within the range 12°–120°.

8. A method according to claim 7, wherein said apex angle is within the range 40°–90°.

9. A method according to claim 1, wherein said swirling flow of said hot flue gas in said reaction zone is provided by bringing said gas into rotation before said gas is introduced axially in said reaction zone.

10. A method according to claim 1, wherein said swirling flow of said hot flue gas in said reaction zone is provided by introducing a second stream of said hot flue gas tangentially into said reaction zone.

11. A method according to claim 10, wherein said swirling flow of said hot flue gas in said reaction zone is provided by introducing a second stream of said hot flue gas tangentially at one or several positions at said lower part of said reaction zone.

12. A method according to claim 1, wherein said absorption agent is a powder with a particle size within the range 20–150 micron.

13. A method according to claim 1, wherein said absorption agent is soft burned lime.

14. A method according to claim 13, wherein said lime has a temperature within the range 500°–900° C.

15. A method according to claim 13 or claim 14, wherein said absorption agent is introduced into said reaction zone as a gas suspension.

16. A method according to claim 15, wherein said absorption agent is introduced into said reaction zone directly from a gas suspension calciner.

17. A method according to claim 3 wherein the retention time of said gas in said reaction zone is in the range of 1–5 seconds, and the retention time of said material in said reaction chamber is within the range 1–8 minutes.

18. A method according to claim 17, wherein said gas retention time is within the range of 2–3 seconds and said material retention time is within the range 3–5 minutes.

19. A method according to claim 1, wherein a part of said powder precipitated in said separating zone is recirculated to said reaction zone and the external powder recirculation rate is equal to between 10–70 times the input rate of said absorption agent and solid particles present in said hot flue gas.

20. A method according to claim 19, wherein said external powder recirculation rate is equal to between 15–30 times said input rate of said abosorption agent and solid particles present in said hot flue gas.

21. A method according to claim 19 or claim 20, wherein said powder precipitated in said separating zone is subjected to mechanical treatment for generating new reaction surface.

22. A method according to claim 1, wherein said separating zone comprises first and second subzones, said first subzone being for precipitation of coarse particles and said second subzone being for precipitation of fine particles.

23. A method according to claim 22, wherein a heat recovery zone is installed between said first and second subzones.

* * * * *